US012222075B1

(12) United States Patent
Benjestorf et al.

(10) Patent No.: US 12,222,075 B1
(45) Date of Patent: Feb. 11, 2025

(54) NON-METALLIC CONNECTION LIGHT COUPLER

(71) Applicant: Non-Metallic Connectors, Inc., Harrisburg, PA (US)

(72) Inventors: Joshua S. Benjestorf, Harrisburg, PA (US); Frank D. Johns, Harrisburg, PA (US)

(73) Assignee: Non-Metallic Connectors, Inc., Harrisburg, PA (US)

( * ) Notice: Subject to any disclaimer, the term of this patent is extended or adjusted under 35 U.S.C. 154(b) by 0 days.

(21) Appl. No.: 18/938,683

(22) Filed: Nov. 6, 2024

Related U.S. Application Data

(60) Provisional application No. 63/556,460, filed on Feb. 22, 2024.

(51) Int. Cl.
*F21K 9/238* (2016.01)
*F21V 23/06* (2006.01)

(52) U.S. Cl.
CPC .............. *F21K 9/238* (2016.08); *F21V 23/06* (2013.01)

(58) Field of Classification Search
CPC ................................. F21K 9/238; F21V 23/06
See application file for complete search history.

(56) References Cited

U.S. PATENT DOCUMENTS

2015/0349847 A1* 12/2015 Hassan-Ali .............. H04B 5/72 455/41.1
2018/0035518 A1* 2/2018 Cook ..................... H05B 47/19
2020/0306001 A1* 10/2020 Silver .................... A61B 90/35
2022/0299717 A1* 9/2022 Lin ...................... G02B 6/4292
2023/0043693 A1* 2/2023 Benjestorf ............. F21V 23/06

* cited by examiner

*Primary Examiner* — Evan P Dzierzynski
(74) *Attorney, Agent, or Firm* — Panitch Schwarze Belisario & Nadel LLP

(57) ABSTRACT

A light coupler includes a housing, a base formed at an end of the housing and including a pair of externally facing metal contacts configured to electrically connect to an external power supply, and a light power supply disposed within the housing. The light power supply includes a supply input configured to electrically connect to the pair of metal contacts. A recess is formed on the housing and is free of metallic material. A contactless electrical power transmitter is disposed within the housing and adjacent to the recess. The contactless electrical power transmitter is electrically connected to the light power supply and configured to contactlessly transmit electrical power to a light bulb received in the recess.

17 Claims, 9 Drawing Sheets

NON-METALLIC CONNECTION LIGHT COUPLER

CROSS-REFERENCE TO RELATED APPLICATIONS

This application claims the benefit of U.S. Provisional Patent Application No. 63/556,460, filed on Feb. 22, 2024, entitled "Non-Metallic Connection Light Coupler," the entire contents of which are incorporated by reference herein.

BACKGROUND

Embodiments described herein relate generally to lighting, and more particularly, to a light coupler that can adapt a standard electrical light bulb socket for use with a contactless powered light bulb.

Applicant has previously introduced in U.S. Pat. No. 11,764,610 (which is hereby incorporated by reference) a light bulb and corresponding light bulb socket that are capable of exchanging power in a contactless manner, thereby removing the need for exposed electrical contacts. Such combinations can be used in many different and new kinds of environmental settings, including under water in some embodiments.

The new light bulb provides significant energy savings as a result of the configuration in which it consumes contactlessly-provided power. However, installation of the light bulb socket can present challenges, particularly in large installations as it can be prohibitively expensive to replace conventional light bulb sockets with the contactless light bulb sockets described above. It can also be difficult to retrofit decorative or complex lamps where socket replacement might necessitate harm to or destruction of the piece.

It is therefore desired to provide a light coupler that can be used to make standard electrical light bulb sockets compatible with contactless power light bulbs while avoiding the need to replace or significantly modify existing lighting infrastructure or installation.

BRIEF SUMMARY

Briefly stated, one embodiment comprises a light coupler includes a housing, a base formed at an end of the housing and including a pair of externally facing metal contacts configured to electrically connect to an external power supply, and a light power supply disposed within the housing. The light power supply includes a supply input configured to electrically connect to the pair of metal contacts. A recess is formed on the housing and is free of metallic material. A contactless electrical power transmitter is disposed within the housing and adjacent to the recess. The contactless electrical power transmitter is electrically connected to the light power supply and configured to contactlessly transmit electrical power to a light bulb received in the recess.

In one aspect, the contactless electrical power transmitter is one of a coil transmitter or a capacitive plate transmitter. In a further aspect, the contactless electrical power transmitter is a coil transmitter having a spiral geometry that is one of Archimedean or polygonal in shape.

In another aspect, the light coupler includes a reed switch configured to prevent power from flowing to the contactless electrical transmitter unless the reed switch is aligned with an activation magnet from a light bulb received in the recess. In a further aspect, the housing has a longitudinal axis and the reed switch is spaced apart from the longitudinal axis.

In still another aspect, a first of the pair of metal contacts is a metal thread formed on a sidewall of the base and a second of the pair of metal contacts is a metallic tip exposed at an end of the base.

In yet another aspect, the light coupler includes first and second wires that respectively electrically connect the pair of metal contacts to the light power supply.

In still another aspect, the contactless electrical power transmitter is formed of at least one of graphene, carbon, borophene, carbon nanotubes, a conductive composite material.

In yet another aspect, the housing includes a first housing portion and a second housing portion. The base is formed at an end of the first housing portion, the light power supply is disposed within the first housing portion, the second housing portion includes the recess, and the contactless electrical power transmitter is disposed within the second housing portion.

In still another aspect, the light coupler includes one of a metamaterial slab or a meta lens disposed within the housing between the contactless electrical power transmitter and the recess.

Another embodiment comprises a lighting assembly that includes a light bulb having one or more LEDs and a bulb housing containing the one or more LEDs. At least a portion of the bulb housing is at least partially transparent to one or more wavelengths of light emitted by the one or more LEDs. A non-metallic base is formed at an end of the bulb housing. A contactless electrical power receiver is disposed within the non-metallic base and electrically connected to the one or more LEDs. The lighting assembly further includes a light coupler having a coupler housing, a base formed at an end of the coupler housing and including a pair of externally facing metal contacts configured to electrically connect to an external power supply, and a light power supply disposed within the coupler housing. The light power supply includes a supply input configured to electrically connect to the pair of metal contacts. A recess is formed on the coupler housing and is free of metallic material. A contactless electrical power transmitter is disposed within the housing and adjacent to the recess. The contactless electrical power transmitter is electrically connected to the light power supply. When the non-metallic base of the light bulb is received in the recess of the light coupler, the contactless electrical power receiver and the contactless electrical power transmitter are aligned and physically separated from one another such that the contactless electrical power transmitter is enabled to contactlessly transmit electrical power from the light power supply to the contactless electrical power receiver. The contactless electrical power receiver is configured to provide the received electrical power to the one or more LEDs.

In one aspect, the contactless electrical power transmitter is one of an inductive coil transmitter or a capacitive plate transmitter and the contactless electrical power receiver is one of an inductive coil receiver or a capacitive plate receiver. In a further aspect, the contactless electrical power transmitter and the contactless electrical power receiver are each an inductive coil having a spiral geometry that is one of Archimedean or polygonal in shape.

In another aspect, the lighting assembly includes a reed switch disposed within the coupler housing, and an activation magnet embedded or retained within the non-metallic base of the light bulb. The light bulb and the light coupler are rotatable relative to one another between a first position and a second position, such that when the light bulb and light coupler are in the second position, the reed switch and the activation magnet are aligned with one another and the reed switch enables the contactless electrical power transmitter to contactlessly transmit electrical power from the light power supply to the contactless electrical power receiver, and when the light bulb and light coupler are in the first position, the reed switch is not aligned with the activation magnet and prevents power from flowing to the contactless electrical power transmitter.

In yet another aspect, a first of the pair of metal contacts is a metal thread formed on a sidewall of the coupler base and a second of the pair of metal contacts is a metallic tip exposed at an end of the coupler base.

In still another aspect, the contactless electrical power transmitter and the contactless electrical power receiver are each formed of at least one of graphene, borophene, carbon, carbon nanotubes, or a conductive composite material.

In yet another aspect, the light assembly includes one of a metamaterial slab or a meta lens disposed within the coupler housing between the contactless electrical power transmitter and the recess.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
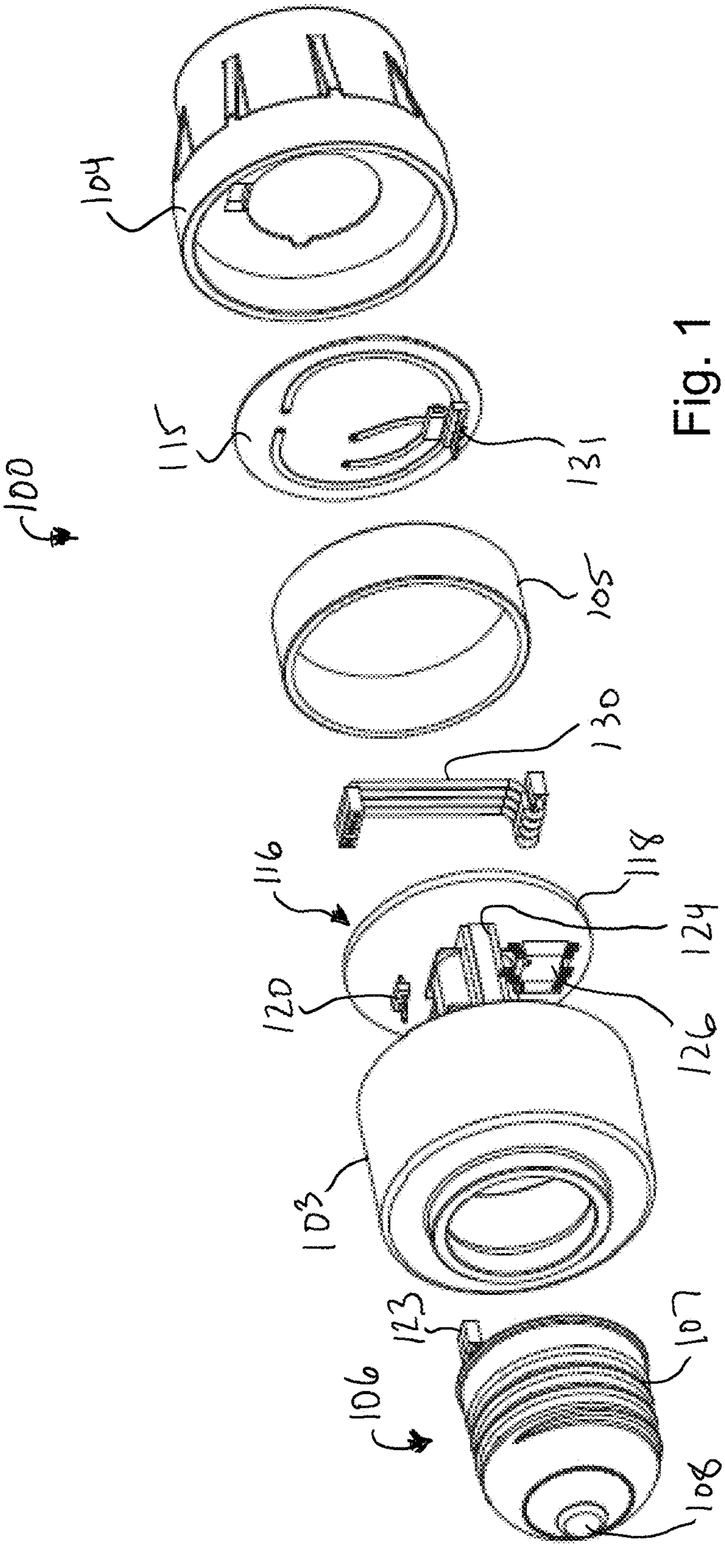
FIG. 1 is a bottom side perspective exploded view of a light coupler in accordance with an example embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
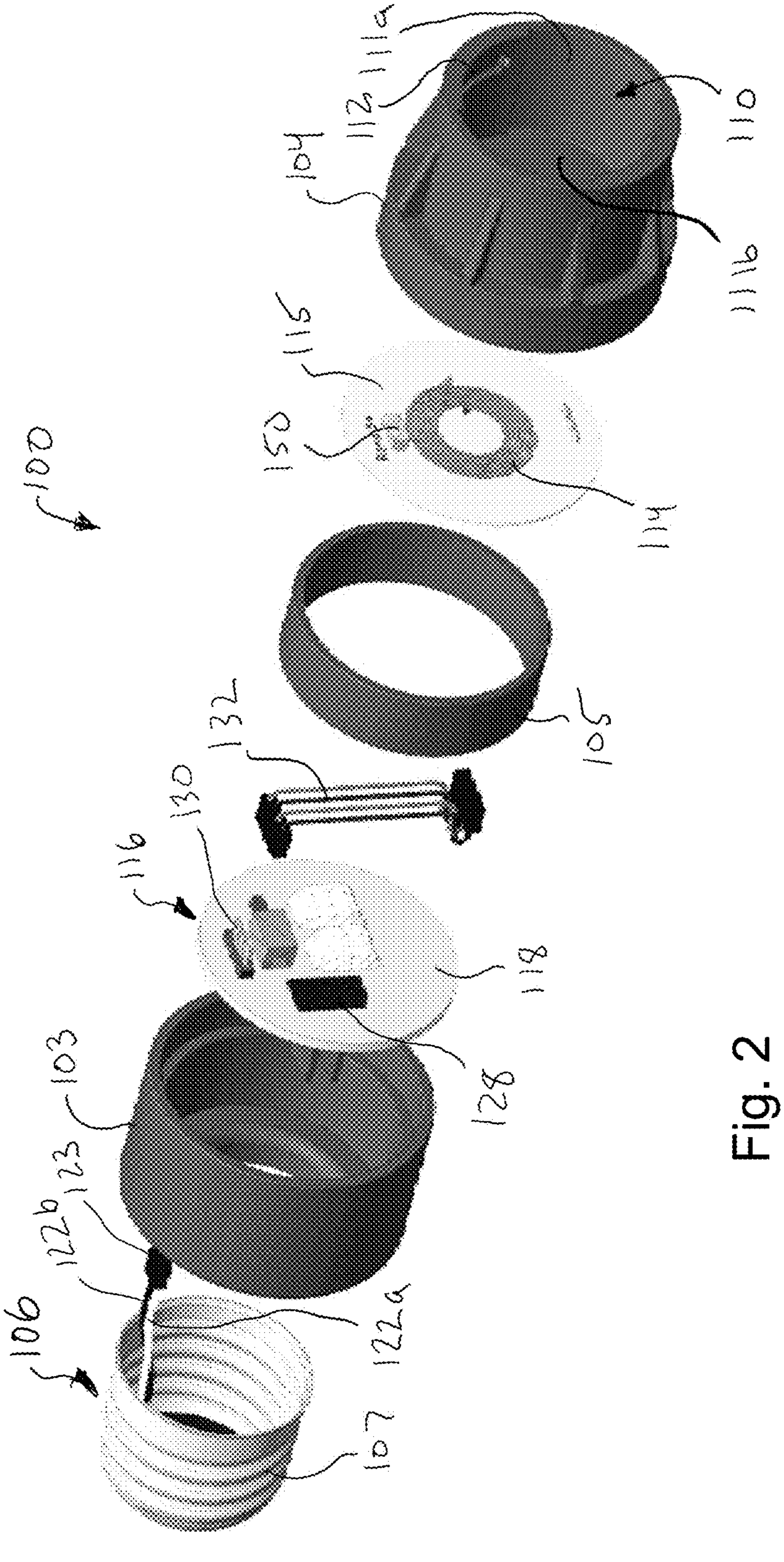
FIG. 2 is a top side perspective exploded view of the light coupler of FIG. 1.
Figure 3:
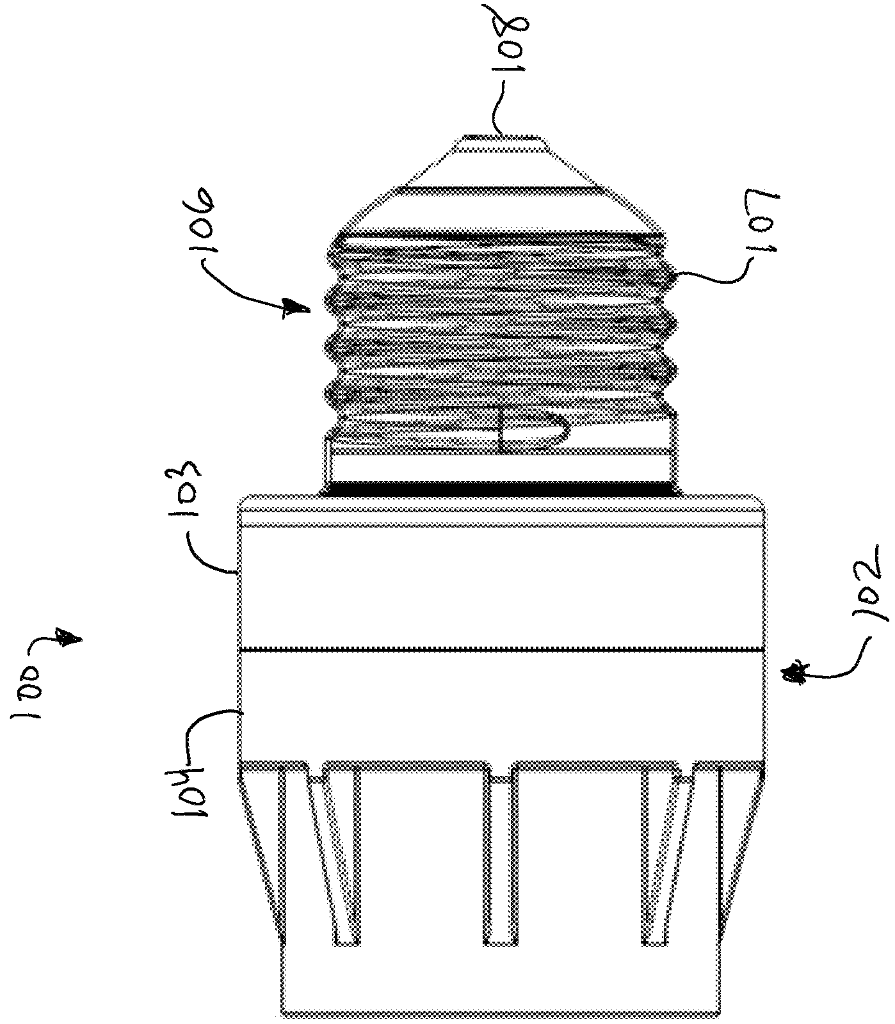
FIG. 3 is a side elevational view of the light coupler of FIG. 1.

Referring to FIGS. 1-3, there is shown an example of a light coupler 100 that can enable a contactless light bulb 12, such as the one shown in FIGS. 6-8 and described in more detail below, to be installed in a standard electrical light socket (not shown). The light coupler 100 may include a housing 102. In the example shown in the drawings, the housing 102 may be made from a first, lower housing portion 103 and a second, upper housing portion 104. However, the housing 102 may be formed by a unitary structure or can be divided among any number of desired portions that can be attached together. The lower and upper housing portions 103, 104 may be press fit to one another at mating ends thereof and supplemented with adhesive. However, other methods of attaching the lower and upper housing portions 103, 104 to one another can be used as well, such as using mechanical fasteners, screw threads, welding, combinations thereof, or the like.

A base 106 may be formed at an end of the housing 102. In this case, the base 106 is provided on an end of the lower housing portion 103 opposite a mating end with the upper housing portion 104. The base 106 may include a pair of externally facing metal contacts 107, 108 that are configured to connect to an external power supply, which typically will be a conventional light socket, such as from a lamp or other lighting fixture (not shown). The first metal contact 107 may be a metal thread formed on a sidewall of the base 106 and the second metal contact 108 may be a metallic tip exposed at an end of the base 106. This provides the light coupler 100 with a conventional Edison screw configuration for installation into a conventional light fixture, and can have conventional sizes, such as E26, E27, or the like. However, other arrangements for the metal contacts 107, 108 may be used as well, such as two pins or other similar types of protuberances, two contact pads, or the like.

A recess 110 may be formed on the housing 102 of the light coupler 100, which is configured to receive the light bulb 12 in an installed configuration. In the example shown in FIGS. 1-4A, the recess 110 is formed at an end of the upper housing portion 104 opposite to a mating end with the lower housing portion 103 and generally opposite to the base 106. However, the recess 110 may be formed anywhere on the housing 102 to account for space, orientation, and/or other design requirements. The recess 110 may be surrounded by a generally cylindrical sidewall 111*a* and terminate in a closed end surface 111*b*. While the recess 110 is shown integrally formed as part of the upper housing portion 104 or otherwise a portion of the overall housing 102, the recess 110 may alternatively be attached to the housing 102 via mechanical fasteners, adhesives, threading, welding, combinations thereof, or the like. Notably, the recess 110 may be free of metallic material to avoid the presence of exposed metallic contacts. For example, the sidewalls 111*a* and closed end surface 111*b* of the recess 110 may be made from plastic or other types of non-metallic, electrically insulative material. As explained in more detail below, a base 24 of the light bulb 12 to be received in the recess 110 is non-metallic, so there is no need for metal components within the recess 110.

Figure 4A:
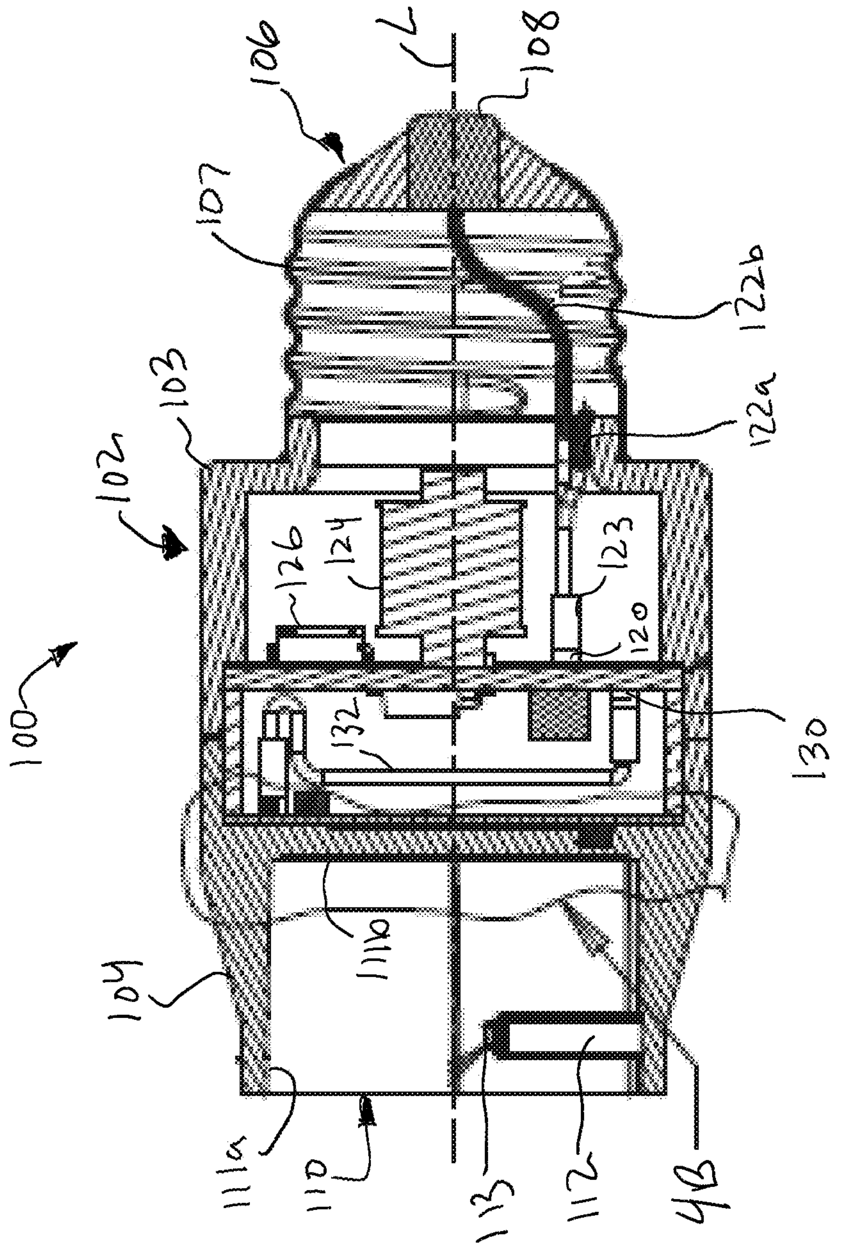
FIG. 4A is a side elevational cross-sectional view of the light coupler of FIG. 1.

In this example, to secure the light bulb 12 to the light coupler 100, the recess 110 may include one or more mating slots 112 that are formed in the cylindrical sidewall 111*a* thereof. The mating slots 112 also include axially extending portions to allow receipt of mating ribs 26 of the light bulb 12 prior to rotation of the light bulb 12 within the recess 110. However, more or fewer mating slots 112 may be provided, and the mating slots 112 may have different shapes, orientations, and/or configurations. In addition to or in place of the mating slot(s) 112, at least one magnet 113 may be disposed in the cylindrical sidewall 111*a* of the recess 110. As shown in the example of FIG. 4A, a magnet 113 may be embedded in the cylindrical sidewall 111*a* adjacent an end of each mating slot 112.

To install the light bulb 12 in the light coupler 100 in this example the base 24 of the light bulb 12 may be inserted into the recess 110 with mating ribs 26 aligned with the axially extending portions of the mating slots 112. Upon reaching the end of its axial travel within the recess 110, the light bulb 12 may then be rotated (this can be clockwise or counter-clockwise depending on the orientation of the mating slots 112) by a predetermined angle (e.g., approximately 45°, although other angles may be used as well) with the mating ribs 26 traversing the circumferentially extending portions of the mating slots 112. At the end of the rotation, a magnet 28 in each mating rib 26 aligns with the respective magnet 113 associated with each mating slot 112. In this example, the mating of the ribs 26 and slots 112 combined with the alignment of the magnets 28, 113 mechanically holds the light bulb 12 in the light coupler 100. Of course, the attachment may be made in other ways depending on the shapes and configurations of the mating ribs 26, the mating slots 112, and the alignment magnets 28, 113, and can include latching or the like, for example. In other embodiments, the recess 110 may include a screw thread (not shown) or other type of mechanical fastening structure for securing the light bulb 12 to the light coupler 100.

Figure 4B:
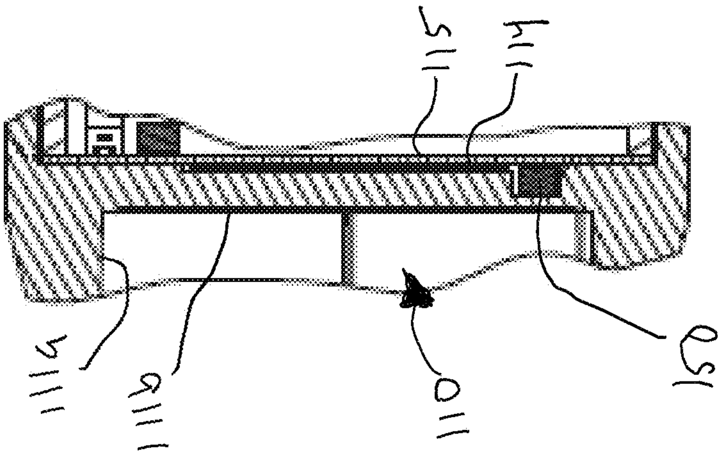
FIG. 4B is an enlarged side elevational cross-sectional view of a portion of the light coupler from FIG. 4A.
Figure 5B:
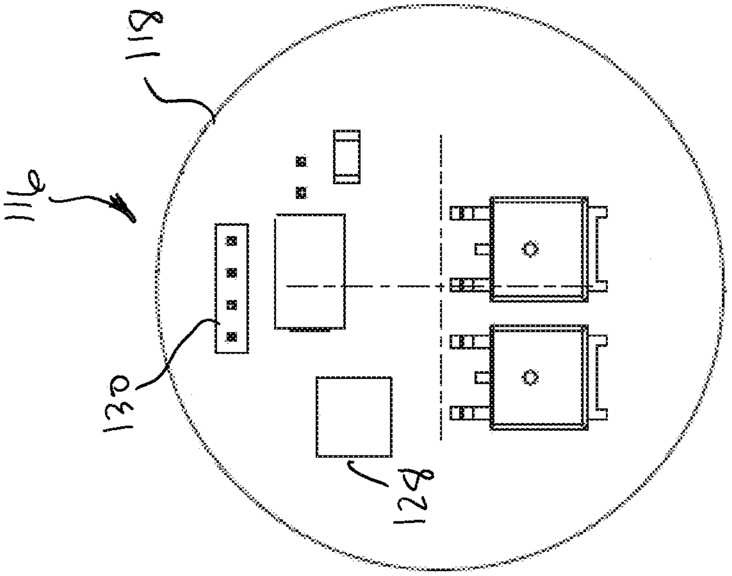
FIG. 5B is a top side plan view of the power supply circuit board of FIG. 5A.
Figure 5A:
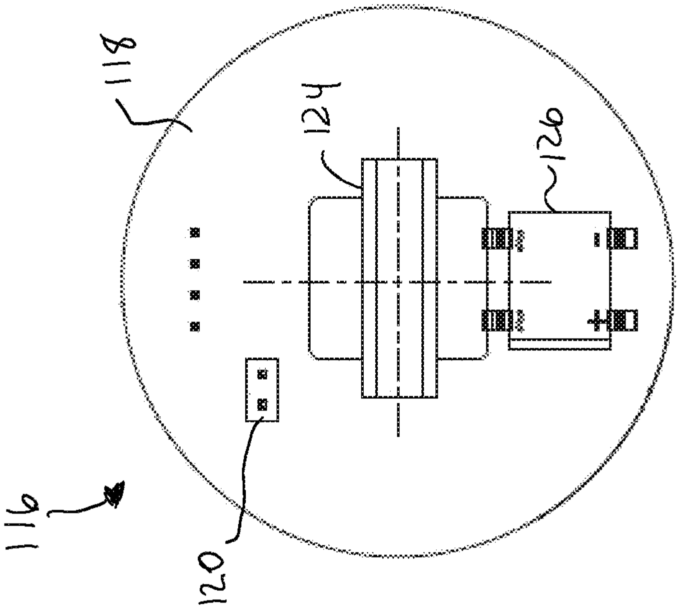
FIG. 5A is a bottom side plan view of a power supply circuit board of the light coupler of FIG. 1.

A contactless electrical power transmitter 114 may be disposed within the housing 102 of the light coupler 100, and more particularly, adjacent to the recess 110. The contactless electrical power transmitter 114 is shown in this embodiment as mounted as part of a printed circuit board 115, but other arrangements may be used as well. In some embodiments, the contactless electrical power transmitter 114 is disposed adjacent to the closed end surface 111*b* of the recess 110. For example, as shown in FIG. 4B, the contactless electrical power transmitter 114 may abut the closed end surface 111*b* on a side opposite to the recess 110. However, the contactless electrical power transmitter 114, or portions thereof, may be disposed anywhere in the housing 102 as necessary to meet particular sizing or shape needs and to facilitate the contactless transmission of electrical power. The contactless electrical power transmitter 114 may be directly or indirectly secured to the closed end surface 111*b* on a side opposite to the recess 110 and/or other components of the housing 102 through friction fit, mechanical fasteners, adhesives, 3D printing or another additive method, or the like. In the embodiment shown, the contactless electrical power transmitter 114 is a coil transmitter such as part number 760308105214 available from WURTH ELEKTRONIK. The coil transmitter 114 shown in FIG. 2 includes a spiral architecture, and in particular an Archimedean spiral, but other types of spiral architectures may be used in keeping within the scope and spirit of the invention, including polygonal, such as square, hexagonal, octagonal, or the like. Spirals may also be single layered or multi-layered, as desired. Moreover, coils can have varying thicknesses between adjacent traces such that electrical current flowing therein is concentrated so as to reduce impedance and enhance the Q-factor of the coils. In addition, while the contactless electrical power transmitter 114 may be made from copper, other types of conductive materials may be used instead to improve electrical properties, electrical performance, electrical power density, thermal properties, and the like, such as graphene, carbon, carbon nanotubes, borophene, combinations thereof, or the like. Conductive composite materials can also be utilized, such as where graphene, carbon, carbon nanotubes, borophene, combinations thereof, or the like are mixed together with copper or other metal(s). Additionally or alternatively, other types and styles of inductor coils may be used. Still further, the contactless electrical power transmitter 114 may instead comprise a capacitive plate, a combination of an inductor coil and a capacitive plate, or the like. In some embodiments, the contactless electrical power transmitter 114 may be configured to transmit data in addition to the power signal over the same interface, although the light coupler 100 may also include a separate high-speed data circuit (not shown) to transmit and/or received data.

A light power supply 116 may be disposed within the housing 102. In the embodiment shown in the drawings, the light power supply 116 is mounted within an inner cavity of the housing 102 along with the contactless electrical power transmitter 114. The inner cavity may be formed by a hollow interior of the lower housing portion 103 and may be closed at one end by the closed end surface 111*b* from the upper housing portion 104. The inner cavity may be isolated from the recess 110 to prevent inadvertent physical contact with the light power supply 116, contactless electrical power transmitter 114, or other components via the recess 110. However, the cavity may be formed in any manner consistent with the configuration and assembly of the housing 102.

The light power supply 116 may be arranged on a printed circuit board 118 that may be secured to the housing 102, such as the lower housing portion 103. For example, as shown in the figures, the printed circuit board 118 may be mounted oriented substantially perpendicularly to a longitudinal axis L of the housing 102, and substantially parallel with the contactless electrical power transmitter 114. Other orientations of the printed circuit board 118 and/or the light power supply 116 may be used as well. In the embodiment shown in the figures, the printed circuit board 118 may be press fit between a rim created by the lower housing portion 103 and a spacer portion 105 disposed within the cavity of the housing 102. The spacer portion 105 is shown contacting and separating the printed circuit board 118 with the light power supply 116 at one end and the printed circuit board 115 with the contactless electrical power transmitter 104 at an opposing end. The coupling of the lower and upper housing portions 103, 104 may create pressure on the spacer portion 105 to hold the printed circuit boards 115, 118 in place. Of course, other methods for mounting the printed circuit boards 115, 118, such as mechanical fasteners, adhesives, welding, combinations thereof, or the like may be used as well. In addition, components of the light power supply 116 need not be confined to a single printed circuit board 118 but may instead be disposed among multiple boards, directly formed or mounted to the housing 102, or the like. In still further embodiments, the light power supply 116 and contactless electrical power transmitter 114 may be supported by a single circuit board.

The light power supply 116 may include a supply input 120 that is configured to electrically connect to the pair of metal contacts 107, 108. In the embodiment shown in the figures, the supply input is in the form of a two-pin header provided on the printed circuit board 118 that may receive connections from first and second wires 122*a*, 122*b* that respectively electrically connect to the first and second metal contacts 107, 108 in the base 106. In this embodiment, the first and second wires 122*a*, 122*b* terminate together in a plug 123 that can quickly couple the wires 122*a*, 122*b* to the two-pin header 120. However, other methods of electrically connecting the metal contacts 107, 108 to the supply input 120 may be used as well. For example, the supply input 120 may be a terminal block with screws, clamps, or other fasteners (not shown) for retaining exposed wire ends (not shown).

The light power supply 116 may further include other electronic components for conditioning the electrical signal received from the metal contacts 107, 108. For example, the light power supply 116 may include a transformer 124 that can be used to change the voltage level of the electrical signal received from the metal contacts 107, 108. For example, if the metal contacts 107, 108 supply a mains power at 120 or 240 VAC, the transformer 124 may step the voltage down to, e.g., 5 VAC to operate the bulb 12. The light power supply 116 may further include a rectifier 124 for converting an AC electrical signal received from the metal contacts 107, 108 into a DC electrical signal. The light power supply 116 may further include inverter circuitry 128 that can be used to supply the contactless electrical power transmitter 114 with a conditioned AC signal at an appropriate frequency for contactless power transmission. Other electronics as needed may also be provided for the light power supply 116, including any MOSFETs, capacitors, resistors, processors, and/or the like. A four pin header 130 may be provided to connect the light power supply 116 to the contactless electrical power transmitter 114. For example, a cable 132 may be provided that electrically connects the four pin header 130 on the printed circuit board 118 to a complementary four pin header 131 on the printed circuit board 115 supporting the contactless electrical power transmitter 114. However, other methods of connecting the light power supply 116 to the contactless electrical power transmitter 114 may be used as well. It is further contemplated that the electronics shown and described herein may be distributed differently. For example, the inverter circuitry 128 may be provided on the printed circuit board 115 with the contactless electrical power transmitter 114.

The light coupler 100 can also include additional performance enhancement circuitry using negative impedance converters (NICs) that are based on non-Foster circuits. These circuits are designed to significantly enhance the Q-factor by simulating a negative resistance, negative inductance, negative capacitance, or a combination thereof. The size of the contactless electrical power transmitter 114 will determine if this performance enhancement technique is used.

The light coupler 100 may also contain any other kinds of sensors (not shown), such as radar sensors to detect motion, additional functionality, such as energy monitoring capabilities, electronics, batteries to store power, and other transmitters to transmit and/or receive data to and from the light coupler 100. These additional capabilities may be housed within the lower housing 103, on the printed circuit board 118 of the light power supply 116, or placed in another location inside the light coupler 100.

FIGS. 6-10 show an example of a light bulb 12 that may be utilized with the light coupler 100 described above, and has been previously described in U.S. Pat. No. 11,764,610. The light bulb 12 may include one or more LEDs 16. Each LED 16 may emit light at one or more wavelengths that may be selected based on the application desired for the particular light bulb 12. For example, a light bulb 12 for a standard ambient light lamp may include LEDs 16 emitting a form of white light and/or groups of LEDs 16 of varying colors that combine to create white light. LEDs 16 in an array may therefore all be of the same color, or different colors. Other applications may require red, blue, amber, green, or other colors of light. In some embodiments, the light bulb 12 may be configured to allow only certain LEDs 16 in the array to be activated at one time, for example, where the light bulb 12 can be used for alternating color illumination (e.g., rotating between blue, red, and green or the like). The LED(s) 16 may be arranged on an LED board 17, although other configurations for mounting LEDs may be used as well.

The light bulb 12 may also include a housing 18 that contains the one or more LEDs 16. At least a portion of the housing 18 may be at least partially transparent to one or more wavelengths of the light emitted by the one or more LEDs 16. For example, the housing 18 in FIGS. 6-8 may include a diffuser 20 that is positioned in the path of the light emitted by the LEDs 16. While a diffuser 20 is shown, the housing 18 may alternatively utilize clear or semi-opaque glass or plastic in the light path. Moreover, the diffuser 20 or other structure permitting the passage of light from the LEDs 16 may be mechanically connected to (e.g., by snap-fit, adhesive, fasteners, welding, or the like) the remainder of the housing 18 or may be integrally formed with the housing 18.

Figure 6:
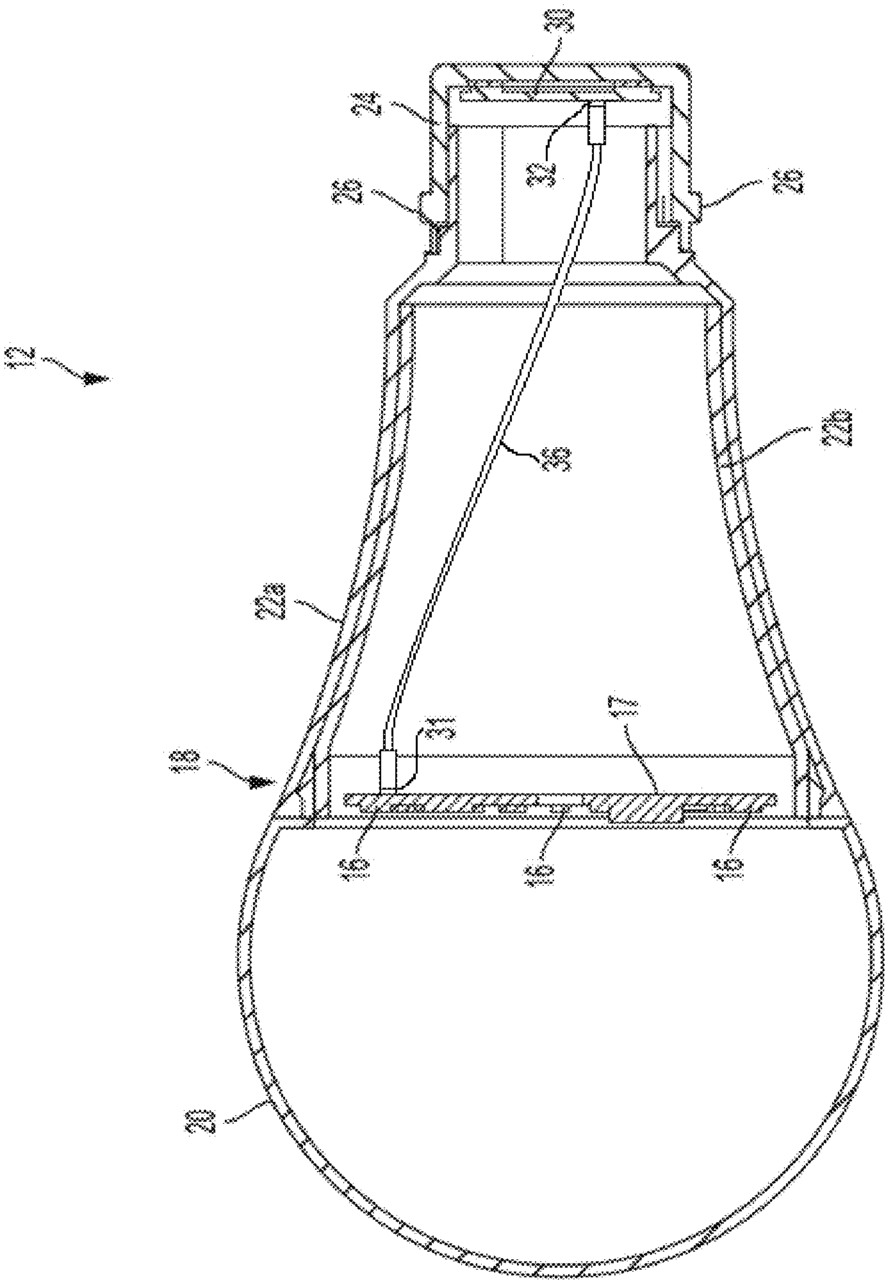
FIG. 6 is a side elevational cross-sectional view of a light bulb for use in connection with the light coupler of FIG. 1.
Figure 7:
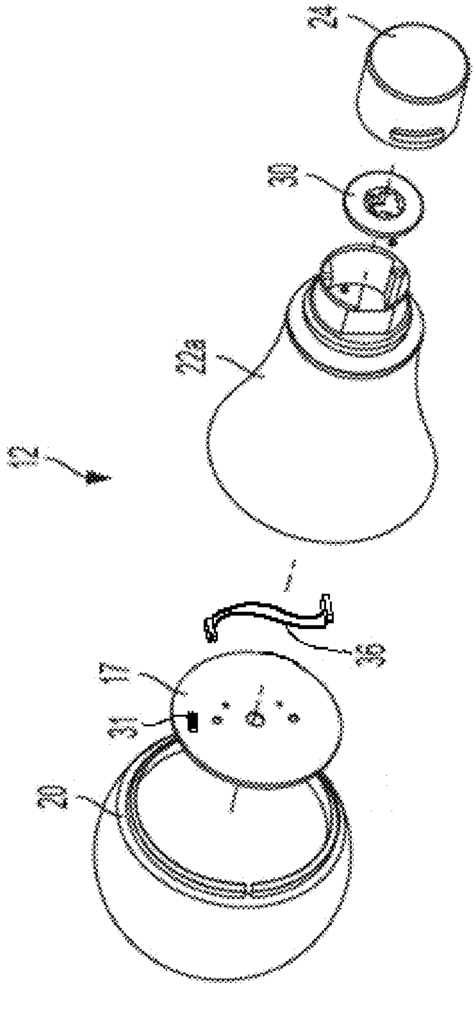
FIG. 7 is a bottom side perspective exploded view of the light bulb of FIG. 6.
Figure 8:
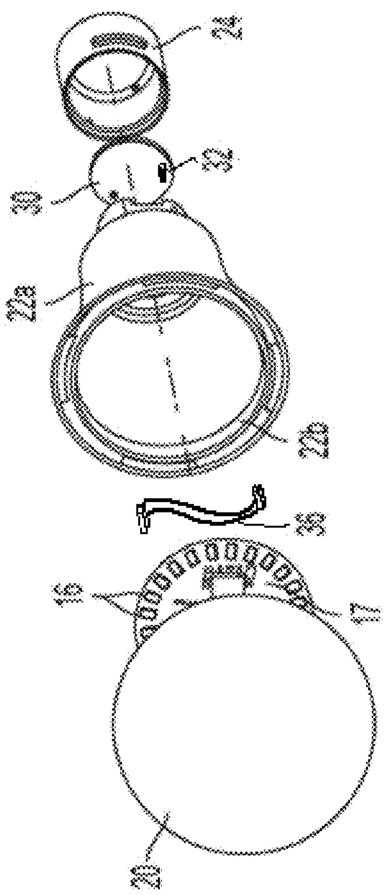
FIG. 8 is a top side perspective exploded view of the light bulb of FIG. 6.

In FIGS. 6-8, a portion of the housing 18 may include one or more components functioning as a heat sink. In this example, the housing 18 may include an outer shell 22*a* connected to the diffuser 20 and an inner shell 22*b* in contact with and surrounded by the outer shell 22*a*. The outer and inner shells 22*a*, 22*b* may be made from plastic, ceramic, combinations thereof, or other like thermally conducting materials capable of leading heat generated by the LEDs 16 and other components located within the housing 18 to ambient air or other lower temperature conduits. While outer and inner shells 22*a*, 22*b* are shown in the drawings, a single structure or additional multiple structures may be used to provide heat sink capabilities. Heat sinks may take other forms as well.

The light bulb 12 may also include a non-metallic base 24 formed at the end of the housing 18. The base 24 may effectively replace the screw thread and bottom contacts on a conventional light bulb. The base 24 in FIGS. 6-8 is shown as a generally cylindrically shaped cap that is fitted onto an end of the outer shell 22 of the housing 18. However, the base 24 may be secured to alternative portions of the housing 18 or formed as an integral portion of the housing 18. The base 24 may be made from plastic, although other non-metallic, electrically insulative materials may be used as well.

Figure 9:
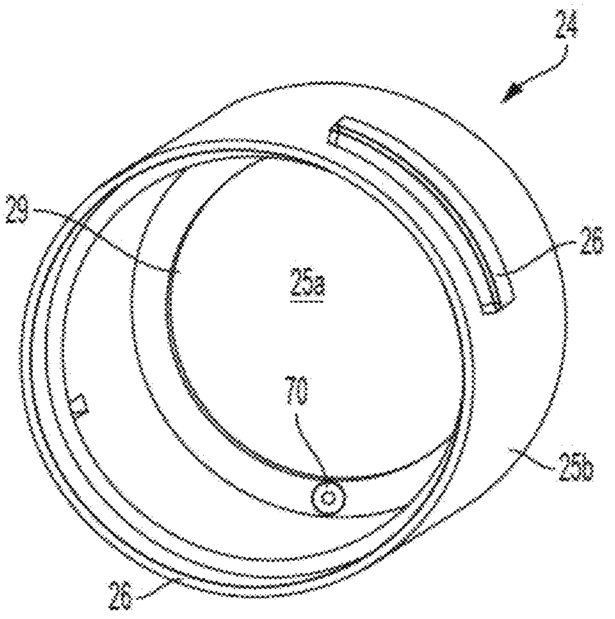
FIG. 9 is a top side perspective view of a base for the light bulb of FIG. 6.
Figure 10:
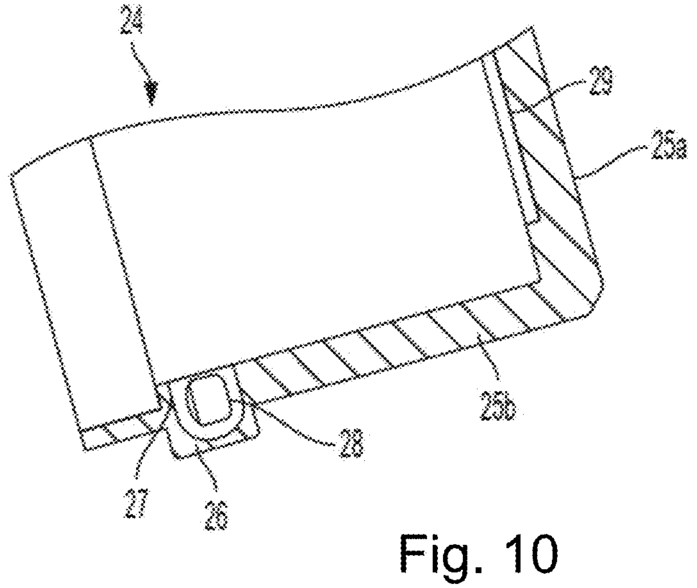
FIG. 10 is an enlarged side cross-sectional view of a portion of the base of FIG. 9.

An example of the base 24 is shown further in FIGS. 9-10. The base 24 may include an end plate 25*a* and a cylindrical sidewall 25*b* extending therefrom, although other shapes and configurations may be used as well, which may be influenced by spacing requirements, shape of the recess 110 of the light coupler 100, or other like considerations. In this example, to secure the light bulb 12 to the coupler 100, the base 24 may include one or more mating ribs 26 that protrude out from the cylindrical sidewall 25*b*. In FIG. 9, the base 24 includes two mating ribs 26 located on opposite one another on an outer surface of the cylindrical sidewall 25*b*, with each extending along a portion of the circumference of the cylindrical sidewall 25*b*. However, more or fewer mating ribs 26 may be provided, and the mating ribs 26 may have different shapes, orientations, and/or configurations. In addition to or in place of the mating rib(s) 26, at least one magnet 28 may be disposed in the cylindrical sidewall 25*b* of the base 24. As shown in FIG. 10, the cylindrical sidewall 25*b* may include one or more pockets 27 to accommodate each of the magnets 28 provided. In this example, the pocket 27 also partially extends into one of the mating ribs 26. As an alternative, one or more magnets 28 may be molded into a material of the base 24 rather than having pockets formed in the cylindrical sidewall 25*b*. As described above, the rib(s) 26 and/or magnet(s) 28 may be used to secure the light bulb 12 in the light coupler 100. However, in other embodiments, the base 24 may include a screw thread (not shown) or other type of mechanical fastening structure for securing the light bulb 12 to the light coupler 100.

Referring back to FIGS. 6-8, the light bulb 12 may further include a contactless electrical power receiver 30 disposed within the housing 18 thereof, and more particularly, in the non-metallic base 24. In some embodiments, the contactless electrical power receiver 30 is disposed adjacent to the end plate 25*a* of the base 24. For example, as shown in FIGS. 9-10, the end plate 25*a* may include a recessed portion 29 shaped and be configured to receive the contactless electrical power receiver 30. However, the contactless electrical power receiver 30, or portions thereof, may be disposed anywhere in the base 24 as necessary to meet particular sizing or shape needs and to facilitate the contactless receipt of electrical power. The contactless electrical power receiver 30 may be secured to the end plate 25*a*, other portions of the base 24, and/or other components of the housing 18 through friction fit, mechanical fasteners, adhesives, or the like. In the embodiment shown, the contactless electrical power receiver 30 is a receiving inductor coil, such as part number 760308105214 available from WURTH ELEKTRONIK. The contactless electrical power receiver 30 may be the same or a different make or model as the contactless electrical power transmitter 114 in the light coupler 100. The variations described above for the contactless electrical power transmitter 114 may be applied for the contactless electrical power receiver 30, as well. As such, different types and styles of inductor coils may be used. Still further, the contactless electrical power receiver 30 may instead comprise a capacitive plate, a combination of an inductor coil and a capacitive plate, or the like.

The contactless electrical power receiver 30 may be electrically connected to the LED(s) 16 for driving the same. The contactless electrical power receiver 30 may make electrical connection to the LED(s) 16 via a cable 36. In FIGS. 6-8, the LEDs 16 are shown mounted on a circuit board 17. The circuit board 17 may include a header 31 and a corresponding header 32 may be electrically connected to the contactless electrical power receiver 30. The cable 36 may couple to the headers 31, 32 to deliver received electrical power from the contactless electrical power receiver 30 to the LEDs 16. In this manner, the light bulb 12 may not need an internal power supply as required in conventional LED light bulbs to meet high voltage requirements. Because the light coupler 100 may drop the power delivered to the light bulb 12 via the contactless interface down by about an order of magnitude, a power supply may not be needed. While in the depicted embodiment, the cable 36 directly provides the power directly to the LEDs 16, in other embodiments, the LEDs 16 may alternatively be indirectly electrically connected to the contactless electrical power receiver 30, for example, via intervening components or circuitry (not shown). For example, a rectifier (not shown) may be provided to receive the power from the contactless electrical power receiver 30 via the cable 36 or some other connection and convert the received AC electrical signal into a DC electrical signal, with or without voltage stepping, for provision to the LEDs 16. Such a rectifier or other intervening circuitry providing the electrical connection of the contactless power receiver 30 to the LEDs can be supported on the circuit board 17, and/or distributed elsewhere within the housing 18. As another, non-limiting example, the light bulb 12 may include a driver and associated circuitry, such as is described in U.S. Pat. No. 11,764,610, for electrically connecting the contactless electrical power receiver 30 to the LEDs 16.

When the light bulb 12 is in an installed configuration within the recess 110 of light coupler 100, the contactless electrical power transmitter 114 and the contactless electrical power receiver 30 may be aligned. The two components may be physically separated from one another by at least the end plate 25*b* of the base 24 of the light bulb 12 and the closed end surface 111*b* of the recess 110 in the housing 102 of the light coupler 100. Thicknesses of the end plate 25*b* and the closed end surface 111*b* may be designed to put the contactless electrical power transmitter 114 and the contactless electrical power receiver 30 at an optimum distance from one another for maximizing contactless electrical power transfer. In certain embodiments, when the light bulb 12 is installed in the light coupler 100, the contactless electrical power transmitter 114 and the contactless electrical power receiver 30 may be separated by a distance of about 3 mm. However, other distances may be used as well, depending on the size and other characteristics of the contactless electrical power transmitter 114 and the contactless electrical power receiver 30, space requirements, power requirements, and the like.

Additional performance enhancements for the power transfer signal can also be included. For example, a metamaterial slab or a meta-lens (not shown) may be disposed within the housing 102 of the light coupler 100 between the contactless electrical power transmitter 114 and the closed end surface 111*b* of the recess 100. This metamaterial slab or lens may be custom engineered to have electromagnetic properties to enhance the magnetic and/or electric fields in such a way that the fields are concentrated toward the contactless electrical power receiver 30 in the light bulb 12. This concentration of electromagnetic energy will reduce loss and improve power transfer efficiency (PTE) to create an even more power efficient device. The metamaterial slab or lens can be positioned in any desired orientation based on the desired transmission characteristics. Moreover, the metamaterial slab or lens may be etched, 3D printed or fabricated by any other technique for manufacturing such components. It is also possible to have alternatively or in addition, a metamaterial slab or lens placed within the light bulb 12, such as between the between the contactless electrical power receiver 30 and the end plate 25*b* of the base 24.

It may be desirable to prevent the light coupler 100 from generating electromagnetic fields when the light bulb 12 is not installed in the light coupler 100. In some instances, a lamp or other lighting fixture in which the light coupler 100 is installed may include or be connected to a dedicated power switch (not shown) for turning the lamp or lighting fixture on and off, as is conventionally known. However, it may further be desirable to prevent electromagnetic field generation when the power switch is accidentally in the "on" position while a light bulb 12 is absent or improperly installed.

In the example shown in the drawings, the light coupler 100 may be provided with a reed switch 150 that is configured to prevent power from flowing to the contactless electrical power transmitter 114 from the light power supply 116 until the light bulb 12 is correctly installed. The reed switch 150 may be mounted to the printed circuit board 115 with the contactless electrical power transmitter 114 or another component that electrically connects with the contactless electrical power transmitter 114. In the example shown in the drawings, the reed switch 150 is spaced apart from the longitudinal axis L of the housing 102 of the light coupler 100, although other configurations may be used as well. In FIG. 9, the base 24 of the light bulb 12 may include an activation magnet 70, made from neodymium or the like, embedded or otherwise retained therein. As explained earlier, the light bulb 12 may be inserted into the recess 110 of the light coupler 100 and rotated until the mating ribs 26 reach the end of the mating slots 112. At that point, the activation magnet 70 may come into alignment with the reed switch 150. The activation magnet 70 may activate the reed switch 150 by changing its state from normally open to closed, allowing electrical power to flow to the contactless electrical power transmitter 114. Although the depicted example uses rotation of the light bulb 12 in the recess 110 of the light coupler 100 to align the activation magnet 70 with the reed switch 150, other configurations and orientations may be used as well, including placement of the reed switch 150 and activation magnet 70 in respective sidewalls 111*a*, 25*b* of the recess 110 and base 24. Moreover, other methods for deactivating the contactless electrical power transmitter 114 in the absence of the light bulb 12 may be used as well, including the use of mechanical, optical, or other types of sensors, physical switch activation, combinations thereof, or the like.

Together, the light bulb 12 and the light coupler 100 may form a lighting assembly for installation into conventional lighting fixtures that rely on conventional light bulbs with exposed metal contacts. The concepts described herein may be used with many different types of light bulbs, including standard types (e.g., similar to light bulb 12 shown in the drawings), tubular, floodlight, candle, globe, and the like, and the light coupler 100 may be installed in many different types of fixtures, such as overhead, recessed, wall-mounted, suspended, track, adjustable, enclosures, ceiling fans, and the like. Similarly, the concepts described herein may be used with different types of bulb wattages, temperatures, and other characteristics.

Although shown and described in such a way that the base 24 of the light bulb 12 is received in a recess 110 of the light coupler 100, it is conceivable that the invention may also be implemented through a reverse configuration, wherein the light bulb base forms a recess and fits over and attaches to a mating protrusion of the light coupler while utilizing contactless electrical power transmitters and receivers in a similar manner. It may also be possible to include more than one contactless electrical power transmitter or receiver in a lighting assembly.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A light coupler comprising:

a housing;

a base formed at an end of the housing and including a pair of externally facing metal contacts configured to electrically connect to an external power supply;

a light power supply disposed within the housing, the light power supply including a supply input configured to electrically connect to the pair of metal contacts;

a recess formed on the housing and free of metallic material; and a contactless electrical power transmitter disposed within the housing and adjacent to the recess, the contactless electrical power transmitter being electrically connected to the light power supply and configured to contactlessly transmit electrical power to a light bulb received in the recess.

2. The light coupler of claim 1, wherein the contactless electrical power transmitter is one of a coil transmitter or a capacitive plate transmitter.

3. The light coupler of claim 2, wherein the contactless electrical power transmitter is a coil transmitter having a spiral geometry that is one of Archimedean or polygonal in shape.

4. The light coupler of claim 1, further comprising a reed switch configured to prevent power from flowing to the contactless electrical transmitter unless the reed switch is aligned with an activation magnet from a light bulb received in the recess.

5. The light coupler of claim 4, wherein the housing has a longitudinal axis and the reed switch is spaced apart from the longitudinal axis.

6. The light coupler of claim 1, wherein a first of the pair of metal contacts is a metal thread formed on a sidewall of the base and a second of the pair of metal contacts is a metallic tip exposed at an end of the base.

7. The light coupler of claim 1, further comprising first and second wires that respectively electrically connect the pair of metal contacts to the light power supply.

8. The light coupler of claim 1, wherein the contactless electrical power transmitter is formed of at least one of graphene, carbon, borophene, carbon nanotubes, a conductive composite material.

9. The light coupler of claim 1, wherein the housing includes a first housing portion and a second housing portion, wherein:

the base is formed at an end of the first housing portion, the light power supply is disposed within the first housing portion, the second housing portion includes the recess, and the contactless electrical power transmitter is disposed within the second housing portion.

10. The light coupler of claim 1, further comprising one of a metamaterial slab or a meta lens disposed within the housing between the contactless electrical power transmitter and the recess.

11. A lighting assembly comprising:

a light bulb including:

one or more LEDs, a bulb housing containing the one or more LEDs, at least a portion of the bulb housing being at least partially transparent to one or more wavelengths of light emitted by the one or more LEDs, a non-metallic base formed at an end of the bulb housing, and a contactless electrical power receiver disposed within the non-metallic base and electrically connected to the one or more LEDs; and a light coupler including:

a coupler housing, a base formed at an end of the coupler housing and including a pair of externally facing metal contacts configured to electrically connect to an external power supply, a light power supply disposed within the coupler housing, the light power supply including a supply input configured to electrically connect to the pair of metal contacts, a recess formed on the coupler housing and free of metallic material, and a contactless electrical power transmitter disposed within the housing and adjacent to the recess, the contactless electrical power transmitter being electrically connected to the light power supply, wherein when the non-metallic base of the light bulb is received in the recess of the light coupler, the contactless electrical power receiver and the contactless electrical power transmitter are aligned and physically separated from one another such that the contactless electrical power transmitter is enabled to contactlessly transmit electrical power from the light power supply to the contactless electrical power receiver, the contactless electrical power receiver being configured to provide the received electrical power to the one or more LEDs.

12. The lighting assembly of claim 11, wherein the contactless electrical power transmitter is one of an inductive coil transmitter or a capacitive plate transmitter and the contactless electrical power receiver is one of an inductive coil receiver or a capacitive plate receiver.

13. The lighting assembly of claim 12, wherein the contactless electrical power transmitter and the contactless electrical power receiver are each an inductive coil having a spiral geometry that is one of Archimedean or polygonal in shape.

14. The lighting assembly of claim 11, further comprising:

a reed switch disposed within the coupler housing; and an activation magnet embedded or retained within the non-metallic base of the light bulb, wherein the light bulb and the light coupler are rotatable relative to one another between a first position and a second position, such that:

when the light bulb and light coupler are in the second position, the reed switch and the activation magnet are aligned with one another and the reed switch enables the contactless electrical power transmitter to contactlessly transmit electrical power from the light power supply to the contactless electrical power receiver, and when the light bulb and light coupler are in the first position, the reed switch is not aligned with the activation magnet and prevents power from flowing to the contactless electrical power transmitter.

15. The lighting assembly of claim 11, wherein a first of the pair of metal contacts is a metal thread formed on a sidewall of the coupler base and a second of the pair of metal contacts is a metallic tip exposed at an end of the coupler base.

16. The lighting assembly of claim 11, wherein the contactless electrical power transmitter and the contactless electrical power receiver are each formed of at least one of graphene, borophene, carbon, carbon nanotubes, or a conductive composite material.

17. The lighting assembly of claim 11, further comprising one of a metamaterial slab or a meta lens disposed within the coupler housing between the contactless electrical power transmitter and the recess.

* * * * *